C. H. NOYES.

Band-Combs.

No. 5,348. Reissued April 8, 1873.

Witnesses.

Lyman W. How
Sarah J. Bailey

Inventor.

Charles Homer Noyes.

AM. PHOTO-LITHOGRAPHIC CO. N.Y. (OSBORNE'S PROCESS.)

UNITED STATES PATENT OFFICE.

CHARLES HORACE NOYES, OF ORANGE, NEW JERSEY.

IMPROVEMENT IN BAND-COMBS.

Specification forming part of Letters Patent No. 106,861, dated August 30, 1870; reissue No. 5,348, dated April 8, 1873; application filed March 10, 1873.

*To all whom it may concern:*

Be it known that I, CHARLES HORACE NOYES, formerly of the city of Brooklyn, in the State of New York, now of Orange, in the county of Essex and State of New Jersey, have invented certain new and useful Improvements in Combination Side-Combs; and that the following is a full, clear, and exact description and specification of the same.

The object of my invention is to enable the head-band, which is provided with a comb or comb-teeth on each side of the head, to be employed also as a holder for ribbon or other ornamental material which is used to adorn the head.

One mode in which my invention may be embodied is represented in the accompanying drawing, in which—

Figure 1:
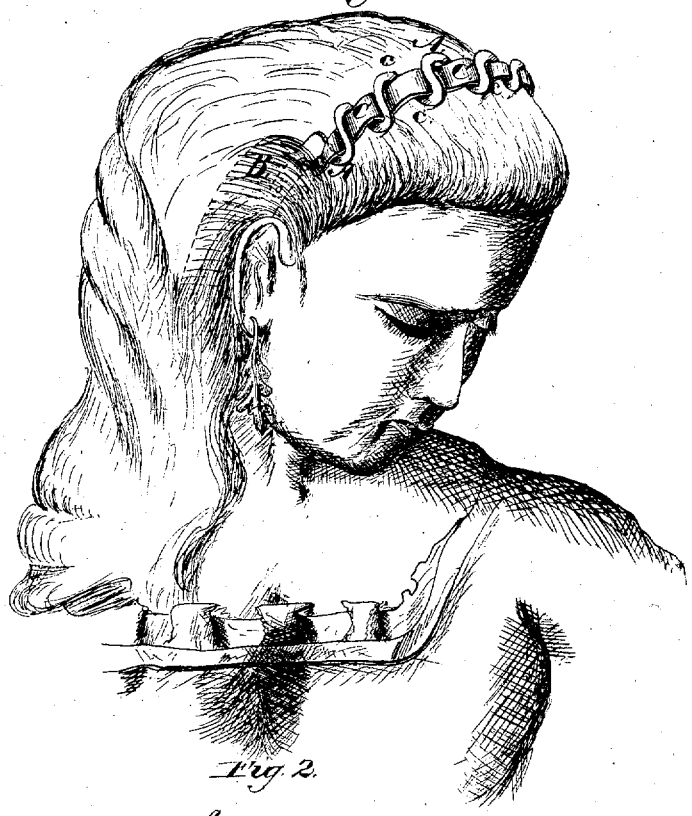
Figure 2:
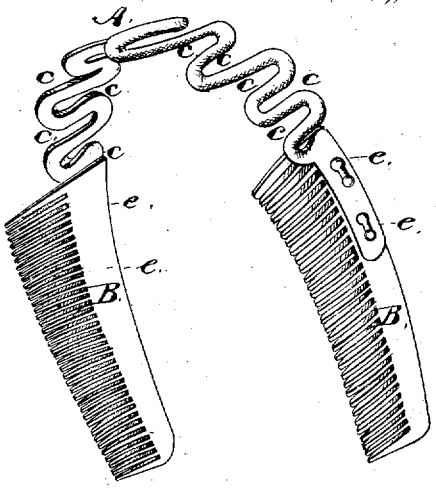

Figure 1 represents the head-band constructed with my improvements and provided with a comb or comb-teeth on each side of the head, and applied to the head. Fig. 2 represents a perspective view of the same.

In this example two side-combs, B B, are combined with the head-band A, which is connected with each side-comb by means of the fastenings *e e*. The form of the head-band is, in this example, serpentine, so that the openings *c c c c* are formed alternately at the opposite edges of the band. This open construction of the band A permits the ornamental ribbon C to be interwoven through the openings so that it presents a highly-ornamental appearance, and is, at the same time, held securely in its place.

Instead of producing the openings in the head-band by giving it a serpentine form, they may be produced by perforating it or by constructing it in the form of an open plate.

The mode in which the open head-band is connected with the side-combs may also be varied, as any of the usual modes in which the head-bands of side-combs are combined with the combs will answer the purpose.

I am aware that the tops of back-combs have been ornamented by being opened in various ways; and also that side-combs have been combined, by means of a head-band without teeth; and that such bands have been connected both rigidly with the combs and in such a manner that the combs and band may be separated. I do not, therefore, claim, broadly, an open or perforated comb, nor the combination of a solid head-band with side-combs; but

What I claim as my invention, and desire to secure by Letters Patent, is—

1. A head-band constructed with openings *c*, and provided with a comb or comb-teeth for holding said band on the head, substantially as described.

2. In combination with a head-band constructed as above described, a ribbon or other ornamental material interwoven with said openings, substantially as and for the purpose specified.

CHARLES HORACE NOYES.

Witnesses:

LUCIUS W. HOW,

SARAH J. BAILEY.